United States Patent [19]
Price

[11] Patent Number: 6,142,297
[45] Date of Patent: Nov. 7, 2000

[54] THERMOMETER SANITIZING DEVICE AND METHOD

[76] Inventor: Walter Price, 47 Rte.17, Bristol, Vt. 05443

[21] Appl. No.: 09/245,489

[22] Filed: Feb. 5, 1999

[51] Int. Cl.[7] .................................................. B65D 85/38
[52] U.S. Cl. ............................ 206/212; 206/306; 206/37; 374/208
[58] Field of Search .................................... 206/306, 305, 206/212, 207, 208, 209, 37, 38, 569; 374/208, 209

[56] References Cited

U.S. PATENT DOCUMENTS

| 990,269 | 4/1911 | Howe | 206/306 |
|---|---|---|---|
| 1,478,286 | 12/1923 | McClellan | 206/212 |
| 1,517,779 | 12/1924 | Glenn | 206/212 |
| 1,947,175 | 2/1934 | Schneider | 206/306 |
| 2,586,448 | 2/1952 | Weber et al. | 206/306 |
| 2,782,909 | 2/1957 | McNamara | 206/209 |
| 3,009,217 | 11/1961 | Weiner | 206/212 |
| 3,495,698 | 2/1970 | Draudt . | |
| 3,549,005 | 12/1970 | Kalegria . | |
| 4,061,226 | 12/1977 | Essen . | |
| 4,823,949 | 4/1989 | Bala . | |
| 5,007,533 | 4/1991 | Purohit | 206/208 |
| 5,775,488 | 7/1998 | Vaught . | |

*Primary Examiner*—Paul T. Sewell
*Attorney, Agent, or Firm*—Downs Rachlin & Martin PLLC

[57] ABSTRACT

A device (30) and method for sanitizing, with a sanitizing medium (52), a thermometer (6) having a probe (16) with a predetermined probe diameter (18). The device consists of a tube (34) having an outer surface (38) and an open end (42) adapted to receive the probe, and a closed end (46) opposite the open end and defining a reservoir (50) for holding the sanitizing medium. The device further includes a cap (60) removably attached to the tube open end and having an upper surface (64) with a central aperture (78) designed to closely receive the probe. At least one wiping member (82) in the cap is capable of forcibly gripping the probe so as to seal the sanitizing medium within the tube and to slidingly engage the probe so as to wipe the sanitizing medium from the probe when extracting the thermometer from the device.

10 Claims, 3 Drawing Sheets

THERMOMETER SANITIZING DEVICE AND METHOD

FIELD OF THE INVENTION

The present invention pertains to a device and method for sanitizing a probe-type thermometer, particularly such thermometers used in performing food product temperature measurements.

BACKGROUND OF THE INVENTION

Probe type thermometers are used to measure temperature in a variety of industries, including the food service industry. In the food service industry, bi-metal instant-read probe thermometers are used to measure the internal temperature of food products as part of the food preparation and service process. The probe in a bi-metal thermometer contains two strips of metal each having a different thermal expansion coefficient. The strips are joined together, and the different expansion of the metals when exposed to heat is translated into a temperature reading displayed on a dial or digital readout on the thermometer.

In the food service industry, a single thermometer is typically used to measure the temperature of many different samples of one or more types of food products, such as meat. However, bacteria from the food product sample whose temperature is being measured can adhere to the probe, rendering the probe unsanitized. Accordingly, to prevent the unsanitized probe from contaminating the next food product sample whose temperature is to be measured, the probe must be sanitized prior to inserting the probe into the next sample.

Presently, in the food service industry, sanitization of thermometer probes between temperature measurements of different food product samples is achieved by manually wiping the probe with an alcohol napkin. This sanitation method requires a constant supply of fresh swabs, which must be properly disposed of after use. Thus, the present probe sanitation method involves multiple steps, including procuring numerous swabs and making them readily available for use, applying the swaps to the probe, and disposing the swabs. Such a multiple-step method lends itself to not being strictly followed, which can result in bacterial contamination of the food product sample being inspected. Also, because the thermometers need to be used repeatedly at a relatively high frequency (e.g., one or more measurements per minute), the present sanitization method is time consuming.

There are several prior art devices for holding and sanitizing thermometers. A typical example is U.S. Pat. No. 3,495,698, which discloses a container for a clinical thermometer in which a liquid disinfectant may be held and in which one end of a thermometer may be immersed. However, the container encloses the entire thermometer and is designed to store the thermometer in a sanitized environment when not in use. In addition, because the container is directed to a clinical application, high-frequency of use (e.g, one or more measurements per minute) is not a primary concern. Accordingly, the container is not portable and needs to be maintained substantially upright to ensure the probe remains in contact with the liquid disinfectant. In addition, the container needs to be maintained substantially upright to prevent the liquid disinfectant from spilling out of the container. Further, the probe needs to be manually wiped clean of the liquid disinfectant upon removing the thermometer from the container.

SUMMARY OF THE INVENTION

The present invention pertains to a device and method for sanitizing a probe-type thermometer, particularly such thermometers used in performing food product temperature measurements.

A first aspect of the invention is a device for sanitizing, with a sanitizing medium, a probe-type thermometer having a predetermine probe diameter. The device consists of a tube having an outer surface, an open end adapted to receive the probe, a closed end opposite the open end and a reservoir for holding the sanitizing medium and at least a portion of the probe. The device further includes a cap removably attached to the open end and having an upper surface with an aperture designed to closely receive the probe. The cap includes at least one member capable of slidingly engaging the probe so as to prevent the sanitizing medium within the tube from passing between the member and the probe. The member is also designed to wipe the sanitizing medium from the probe when extracting the probe from the tube.

A second aspect of the invention is a method of sanitizing a thermometer probe using a sanitizing medium. The method comprises the steps of first, inserting the thermometer probe into the device described immediately above. The second step is extracting the probe from the device.

A third aspect of the invention is a method of measuring the temperature of a first food product using a thermometer with a sanitized probe. The method comprises the steps of first, inserting the probe into the device as described above. The next step is then extracting the probe from the device, thereby providing the sanitized probe. The third and final step is then inserting the sanitized probe into the first food product to measure the temperature of the first food product.

DETAILED DESCRIPTION OF THE INVENTION

The present invention pertains to a device for sanitizing a probe-type thermometer, particularly such thermometers used in performing food product temperature measurements.

Figure 1:
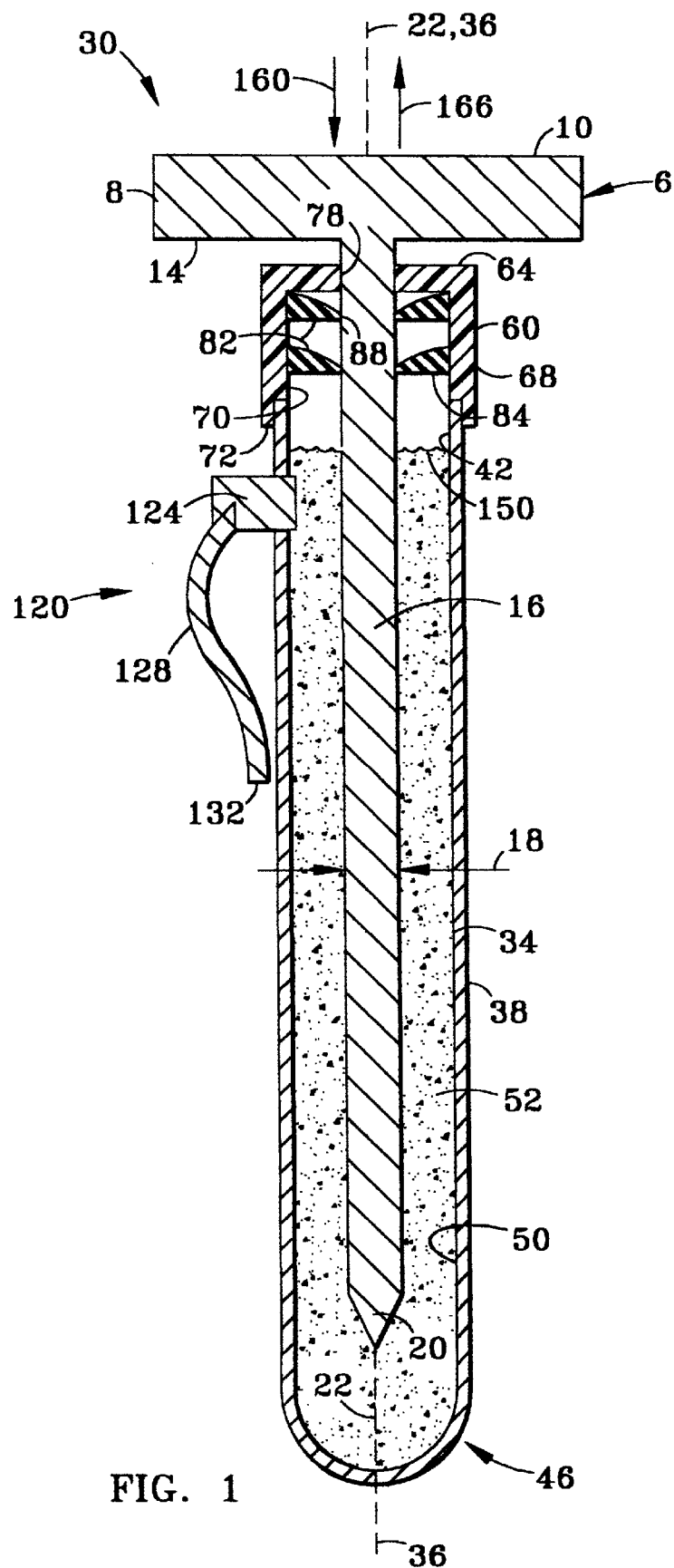
FIG. 1 is a side cross-sectional view of the thermometer sanitizing device of the present invention.

With reference to FIG. 1, device 30 is designed to sanitize a probe thermometer 6 having a head 8 with a top surface 10 and an underside 14. Top surface 10 includes a temperature indication display (not shown), such as a dial overlying a dial plate with indicia thereon to provide an indication of the temperature, a digital readout display, or the like. Attached to underside 14 is an elongate probe 16 of width 18 having a probe end 20 and a longitudinal axis 22.

Figure 2:
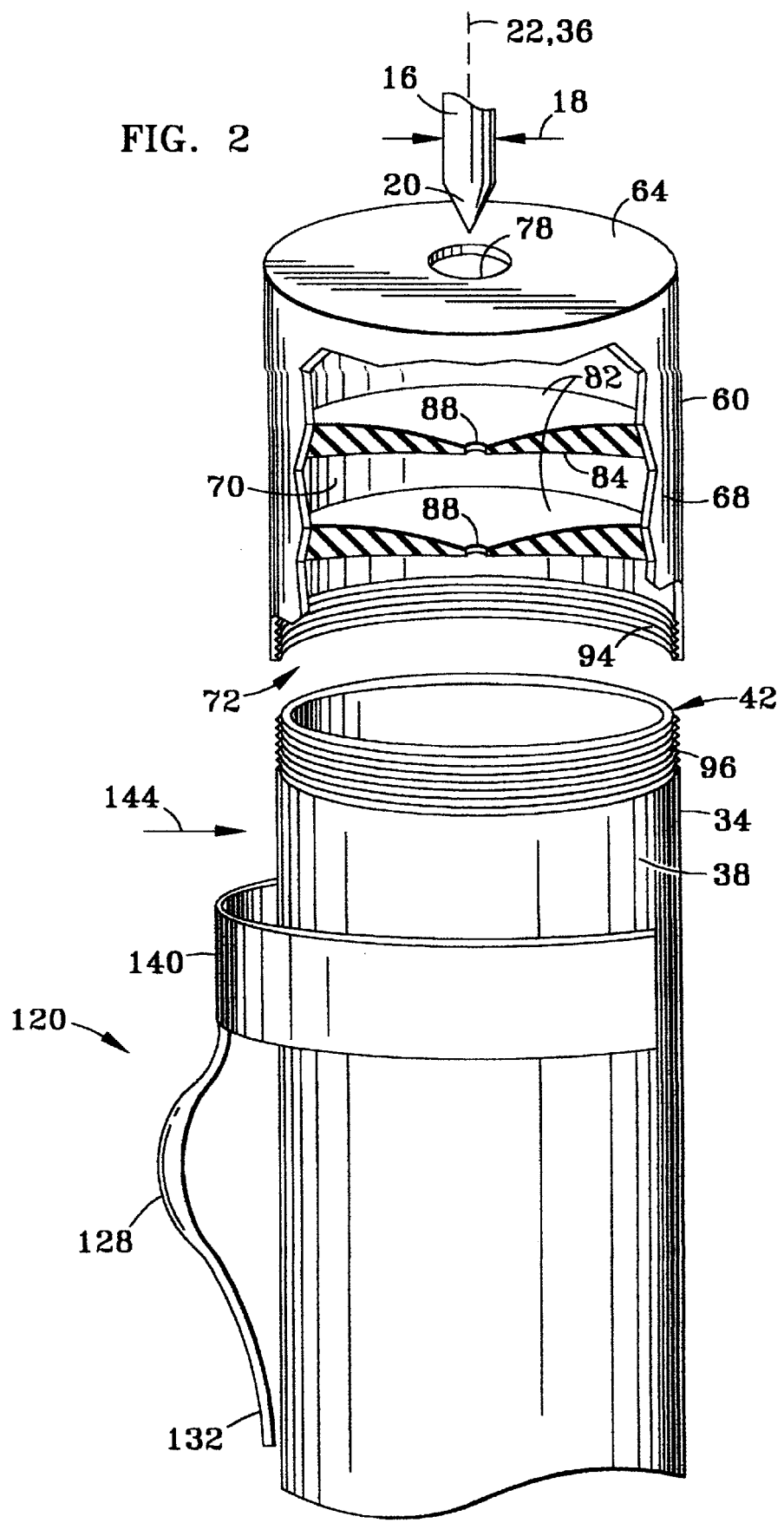
FIG. 2 is a partially cut away, exploded, perspective view of the cap and tube of the device and the thermometer probe shown in FIG. 1, with the cap and tube having threads for removably attaching the cap to the tube, and also showing an alternate embodiment of the pocket clip shown in FIG. 1.

With continuing reference to FIG. 1 and also to FIG. 2, device 30 comprises a tube 34 with a central axis 36, an outer surface 38, and an open end 42 adapted to receive probe 16. Tube 34 further includes a closed end 46 opposite open end 42 thereby defining a reservoir 50 within the tube. Reservoir 50 is capable of holding a sanitizing medium 52, discussed further below. Tube 34 is preferably a unitary structure molded from a rigid thermoplastic material. Tube 34 may also be made from metal, glass composites and other materials not prone to accumulate bacteria and that are relatively easily sterilizable and durable.

Device 30 further includes a cap 60 having an upper surface 64 and a cylindrical sidewall 68 having an inner surface 70. Cap 60 also includes an open end 72 opposite upper surface 64. In operating device 30, cap 60 is removably attached at open end 72 to tube 34 at open end 42, as described below. Cap 60 serves to substantially seal sanitizing medium 52 within tube 34 when attached to the tube.

Figure 3:
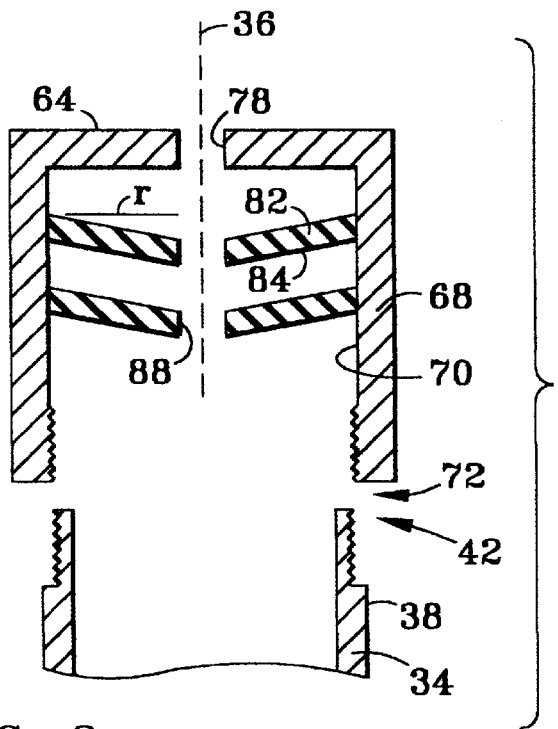
FIG. 3 is a partial side cross-sectional view of the device of FIG. 1, but with the cap and tube having lips designed for removably attaching the cap to the tube.

With continuing reference FIGS. 1 and 2, cap 60 further includes in upper surface 64 a central aperture 78 designed to be aligned with central axis 36 when the cap is attached to tube 34 (FIG. 1). Aperture 78 is sized to receive probe 16, preferably with a closely sliding fit. Extending radially inwardly from inner surface 70 is one or more flexible wiping members 82 (two such members are shown). Each member 82 is preferably made of rubber, pliable plastic or other relatively flexible material. Each member 82 is in the form of an annulus having a cross-section that is, in one embodiment, non-uniform or in another embodiment asymmetric with respect to a plane axially bisecting member 82 and extending perpendicular to central axis 22 (when cap 60 is installed as illustrated in FIG. 1). In addition, the axial thickness of each member 82 preferably decreases from radially outermost portions to radically innermost portions. Alternatively, with reference to FIG. 3, in another embodiment, each member 82 has a cross-section that is axially inclined with respect to a direct radial line r perpendicular to inner surface 70 in a direction away from upper surface 64. The asymmetric and/or inclined geometries of members 82 facilitate slidingly inserting probe 16 of thermometer 6 into device 30 and facilitate the removal of excess sanitizing medium 52 adhering to the probe upon extracting the thermometer from the device, as discussed in greater detail below.

With continuing reference to FIGS. 1 and 2, each member 82 includes a lower surface 84 and an aperture 88, the latter designed to be aligned with axis 36 when cap 60 is attached to tube 34 (FIG. 1). Each aperture 88 is sized equal to or slightly smaller than width 18 of probe 16, thereby providing a close sliding fit or an interference fit. Each type of fit causes, to different degrees, each member 82 to flex and each aperture 88 to expand so as to forcibly grip probe 16 when the probe enters and passes through the aperture. For example, if probe 16 has a circular cross section with an outside diameter of 3 mm, aperture 88 may have a circular cross section with an inside diameter of 3 mm or 3.2 mm. The close sliding fit or interference fit has the purpose of allowing each member 82 to remove excess sanitizing medium 52 from probe 16. One type of fit may be preferred over the other, depending on the type of sanitizing medium 52 used (e.g., fluid or gel).

With reference to FIG. 2, one method of removably attaching cap 60 to tube 34 is to provide the cap with a first set of threads 94 on inner surface 70 at open end 72, and to provide the tube with a second set of threads 96 complementary to threads 94, on outer surface 38 at open end 42. Cap 60 is then attached to and detached from tube 34 by threadably engaging and disengaging threads 94 and 96.

Figure 4:
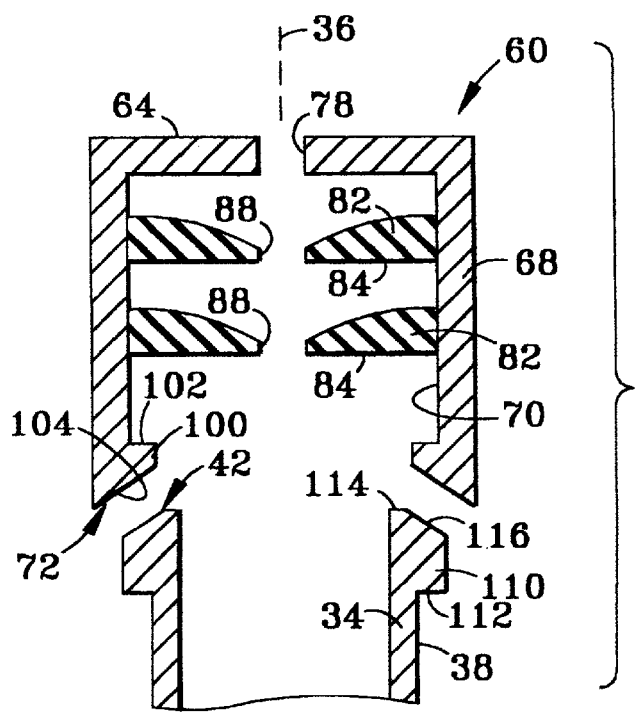
FIG. 4 is a partial side cross-sectional view of the device shown in FIG. 1, but with the cap having radially inclined wiping members.

With reference now to FIG. 4, in an alternate method of attaching cap 60 to tube 34, cylindrical sidewall 68 of cap 60 is made from a flexible material. Now, rather than having threads 94, cap 60 further includes at open end 72 a radially inwardly extending lip 100. The latter includes an upper surface 102 and a lower surface 104. The latter is preferably inwardly beveled such that its innermost edge is closest to upper surface 64, as shown. In addition, rather than having threads 96, tube 34 includes at open end 42 a radially outwardly extending lip 110 having a lower surface 112 and an upper surface 114 with a beveled outer edge 116. The latter is substantially parallel to beveled lower surface 104 when cap 60 is axially aligned with tube 34, as shown.

With continuing reference to FIG. 4, cap 60 is attached to tube 34 by substantially axially aligning the cap with central axis 36 and pressing open end 72 of the cap against open end 42 of the tube. This causes flexible sidewall 68 to flex outwardly, facilitated by the outward force created by forcibly confronting beveled surface 104 of lip 100 and beveled edge 116 of lip 110. The outward flexing of sidewall 68 allows lip 100 to pass over lip 110. Once lip 100 passes over lip 110, sidewall 68 flexes inwardly and returns to its normal shape, whereupon surface 102 matingly engages surface 112, while surface 114 of lip 110 simultaneously confronts lower surface 84 of member 82 near inner surface 70 of the sidewall. Cap 60 is removed by urging the cap along central axis 36 away from tube 34 such that the force between mating surfaces 102 and 112 causes sidewall 68 to outwardly flex, thereby disengaging the two mating surfaces and releasing the cap from the tube.

Referring again to FIGS. 1 and 2, device 30 further includes a pocket-holder clip 120 attached to outer surface 38 of tube 34 near open end 42. A first embodiment of clip 120 includes a base 124 (FIG. 1) attached to outer surface 38 and to which is attached an axially extending clip member 128 with a free end 132. Member 128 is preferably curved along its length such that free end 132 contacts or nearly contacts outer surface 38. The bent shape of clip member 128 provides a spring action (i.e., a restoring force directed toward outer surface 38) when free end 132 is lifted from the outer surface. With reference to FIG. 2, in an alternate embodiment of pocket-holder clip 120, base 124 is replaced with a partial ring member 140 having an inside diameter sized so as to snugly engage outer surface 38 of tube 34. Pocket-holder clip 120 is thus adapted for resilient engagement with a shirt pocket or the like of a user, thereby making device 30 portable and immediately available for use.

In an alternate embodiment, tube 34 may also be mountable to a table, wall or other surface so that a user can easily access thermometer 6. In yet another alternate embodiment, a plurality of tubes 34 may be attached to one another and designed to be mountable to a table, wall or other surface so that a user can easily access a plurality of thermometers 6.

With continuing reference to FIGS. 1 and 2, the operation of device 30 is now described. First, sanitizing medium 52 is added to reservoir 50. Thus, if cap 60 is attached to tube 34, it is removed by unscrewing or otherwise disengaging the cap from the tube, depending on how the cap is attached to the tube, as described above. Once cap 60 is removed, sanitizing medium 52 is added to reservoir 50 through open end 42. Sanitizing medium 52 may be any one of a number of known sanitizing solutions (in liquid or gel form) suitable for use with food processing equipment. Preferably, sanitizing medium 52 is one of the many sanitizing mediums approved by the Food and Drug Administration (FDA), which are listed in 21 CFR 178.0101. For example, a preferred sanitizing medium 52 comprises isopropyl alcohol in combination with quaternary ammonium. After sanitizing medium 52 is added to reservoir 50 to a given level 150 (FIG. 1), cap 60 is re-attached to tube 34 at upper end 42, as described above.

At this point, device 30 is prepared to accept a thermometer 6 to be sanitized. To sanitize thermometer 6, probe 16 is slidingly inserted into device 30. This is achieved by a user grasping tube 34 with one hand and head 8 of thermometer 6 with the other hand, and placing end 20 of probe 16 in relation to aperture 78 such that axis 22 of the thermometer and axis 36 of the tube are substantially aligned. Relative motion is then effected between thermometer 6 and device 30 by the user urging the thermometer along axis 36 in the direction of arrow 160 (FIG. 1) such that probe 16 slidingly passes through aperture 78. End 20 of probe 16 proceeds through aperture 78 and then enters apertures 88 of members 82, whereupon the members flex and apertures 88 expand so that portions of the members adjacent aperture 88 slidingly engage probe 16. Here, the asymmetric cross-section and radially tapering configuration of members 82 (or alternatively, the non-uniform cross-section or the axial inclination of the members (FIG. 4)) facilitates the flexing of the members in the direction of travel of probe 16 (i.e., in the direction of arrow 160) in such a manner that the passing of probe end 20 through the members and toward reservoir 50 proceeds with minimal resistance.

With continuing reference to FIGS. 1 and 2, as thermometer 6 is urged further into device 30, probe end 20 continues to proceed toward tube end 46 and into reservoir 50 until underside 14 of the thermometer confronts upper surface 64 of cap 60. This stops probe end 20 short of tube end 46, thereby leaving a substantial portion of probe 16 (i.e., from level 150 to probe end 20) immersed in sanitizing medium 52. While probe 16 is so immersed, sanitizing medium 52 acts to neutralize bacteria or other undesirable organic matter on the portion of probe 16 immersed in the sanitizing medium, thereby sanitizing the probe.

After thermometer 6 is fully inserted into device 30, the thermometer is then extracted from the device by a user grasping (or continuing to grasp) tube 34 with one hand and effecting relative motion of the thermometer and the device by grasping (or continuing to grasp) head 8 of the thermometer with the other hand and urging the thermometer along axis 22 in the direction of arrow 166 (FIG. 1). As thermometer 10 is extracted from device 30, the asymmetric cross-section and radial taper of members 82 (or alternatively, the non-uniform cross-section or axially inclined members (FIG. 4)) causes the members to forcibly grip and slidingly engage probe 16 so as to wipe from the probe excess sanitizing material 52 adhering thereto. This creates some resistance when extracting thermometer 6 from device 30, the degree of which will vary depending on the nature of the fit (i.e., close fit or interference fit) between the probe and aperture 88. However, this resistance is generally more than that present when slidingly inserting thermometer 6 into the device. Designing each member 82 to forcibly grip probe 16, while still allowing for sliding engagement of the probe as it passes therethrough, results in the removal of excess sanitizing medium 52 from the probe. In addition, the geometry of members 82 prevents the sanitizing medium from escaping from cap 60 through apertures 88 when thermometer 6 is in device 30. This design, together with the fluid-tight seal achieved when cap 60 is engaged with device 30, has the advantageous property that sanitizing medium 52 will not spill from the device during the thermometer sanitizing process, regardless of the spatial orientation of the device. This is particularly important in food industry applications, where device 30 is apt to be used frequently (e.g., one or more times per minute) in working environments where the device cannot always be maintained in a fixed spatial orientation.

Once thermometer 6 is entirely extracted from device 30, probe 16 is sanitized and is ready to be inserted into a food product sample to measure the sample's internal temperature. However, after the temperature of the food product sample is measured and probe 16 removed from the sample, the probe is no longer sanitized. In fact, it is often the case that probe 16 will be covered with excess food product from the sample. In this case, prior to re-inserting the probe into device 30, the excess food product is preferably removed from probe 16 by wiping the probe with a piece of cloth, such as a piece of cloth or a paper towel, by wiping the probe with an alcohol swab, or by rinsing the probe with water. This extra step can be performed quickly, since the goal of the step is not to sanitize probe 16, but simply to remove excess food product from the probe to facilitate sanitizing the probe using device 30.

The above-described sanitization procedure is repeated to re-sanitize probe 16 prior to inserting the probe into a different food product sample. If thermometer 6 is not needed to perform a measurement for an extended period of time, it can be inserted and stored in device 30. With thermometer 6 so stored, the thermometer and device 30 can be transported with the user by clipping the device to the user's shirt pocket, for example, using pocket-clip holder 120.

While the present invention has been described in connection with preferred embodiments, it will be understood that it is not limited to those embodiments. On the contrary, it is intended to cover all alternatives, modifications and equivalents as may be included within the spirit and scope of the invention as defined in the appended claims.

What is claimed is:

1. A system for determining the temperature of food, the system comprising:
    a) a food thermometer having a rigid, unbreakable probe, said probe having an outer surface and a transverse cross-sectional area;
    b) a tube having an outer surface, an open end adapted to receive said probe, a closed end opposite said open end, a central axis extending between said open end and said closed end, and a reservoir holding a sanitizing medium and at least a portion of said probe; and
    c) a cap attached to said tube adjacent said open end, said cap having:
        (i) an upper surface with an aperture therein sized to receive said probe; and
        (ii) at least one resilient member with an opening for receiving said probe, wherein said opening has a cross-sectional area no greater than the transverse cross-sectional area of said probe.

2. A system according to claim 1, wherein said at least one member is configured to engage said probe with a greater force when said probe is being pulled through said opening away from said reservoir than when said probe is being inserted through said opening toward said reservoir.

3. A system according to claim 1, wherein said at least one member has an asymmetric cross section as determined relative to a plane extending normal to said central axis of said tube and intersecting said at least one member.

4. A system according to claim 2, wherein said at least one member has a radially outermost portion, a radially innermost portion and an axial thickness that decreases from said radially outermost portion to said radially innermost portion.

5. A system according to claim 1, wherein said probe is made from metal.

6. A system according to claim 1, said food thermometer having a dial attached to one end of said probe for displaying the temperature of food in which said probe is inserted.

7. A method of sanitizing the probe of a food thermometer using a sanitizing medium, comprising the steps of:
   a) providing the system defined in claim 1, with said reservoir being filled with a sanitizing medium;
   b) inserting the probe through said aperture in said cap and said opening in said at least one member into said sanitizing medium in said reservoir; and
   c) extracting the probe from said reservoir.

8. A method of measuring the temperature of a first food product using a food thermometer with a sanitized probe, comprising the steps of:
   a) providing the system defined in claim 1, with said reservoir being filled with a sanitizing medium;
   b) inserting the probe through said aperture in said cap and said opening in said at least one member into said sanitizing medium in said reservoir;
   c) extracting the probe from said reservoir thereby providing the sanitized probe; and
   d) inserting the sanitized probe into the first food product to measure the temperature of the first food product.

9. A method according to claim 8 for further measuring the temperature of a second food product, further comprising the steps of:
   a) removing the probe from the first food product;
   b) inserting the probe through said aperture in said cap and said opening in said at least one member into said sanitizing medium in said reservoir;
   c) extracting the probe from said reservoir thereby providing a re-sanitized probe; and
   d) inserting said re-sanitized probe into a second food product to measure the temperature of the second food product.

10. A method according to claim 9, further including the step, after said step a), of removing excess first food product from the probe.

* * * * *